Feb. 9, 1943.  E. L. GRIFFITH  2,310,690
COOKING FOOD BY ELECTRIC CONDUCTANCE
Filed Oct. 19, 1940  3 Sheets-Sheet 1
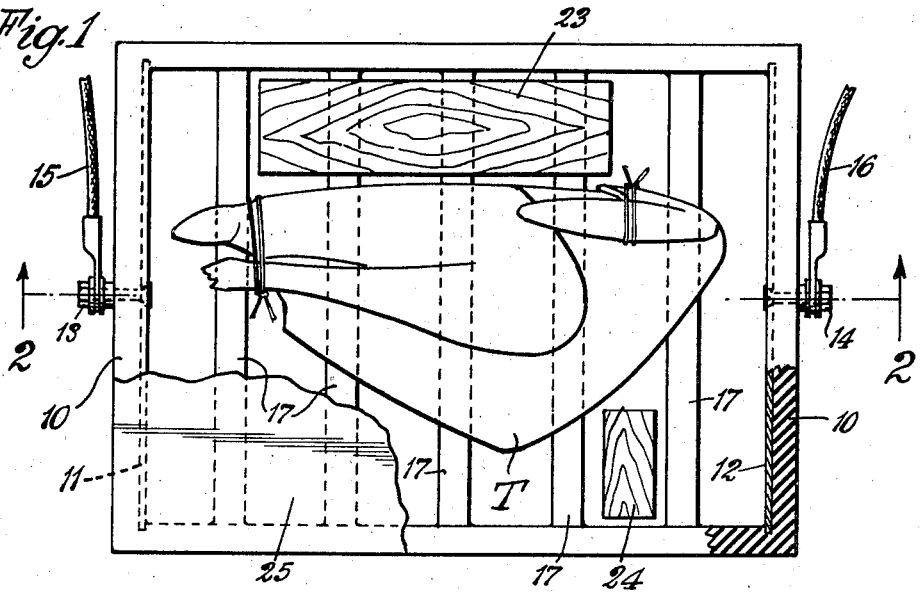
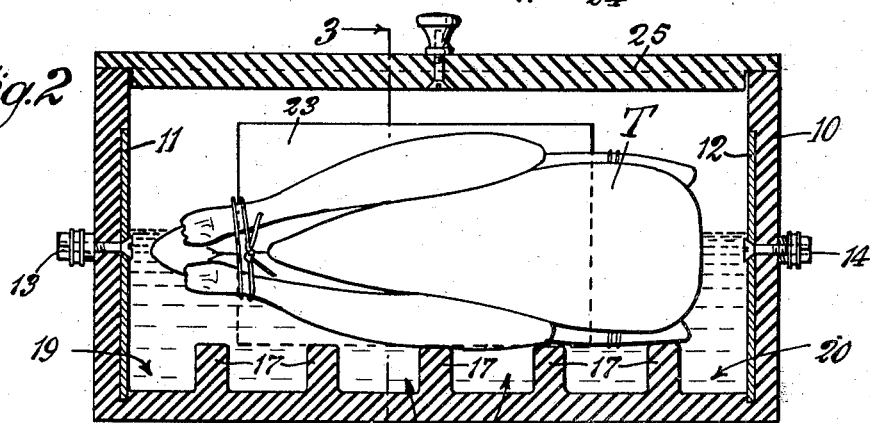
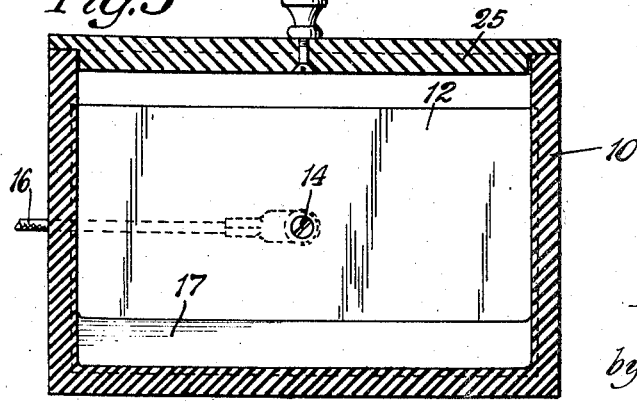
Inventor
Enoch L. Griffith
by W. Bartlett Jones,
Attorney.

Feb. 9, 1943.   E. L. GRIFFITH   2,310,690
COOKING FOOD BY ELECTRIC CONDUCTANCE
Filed Oct. 19, 1940   3 Sheets-Sheet 2
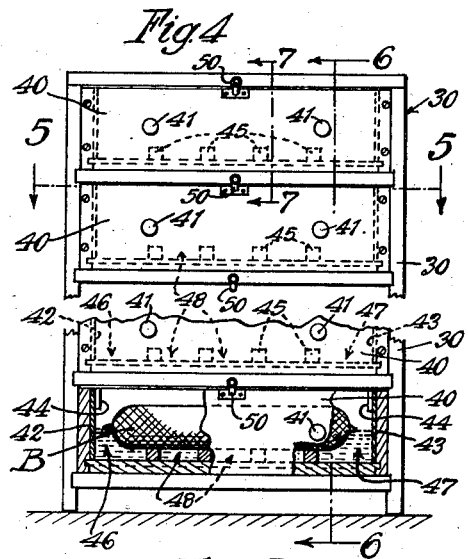
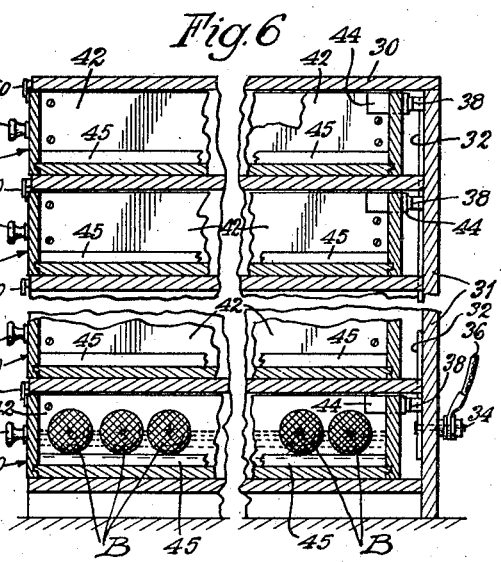
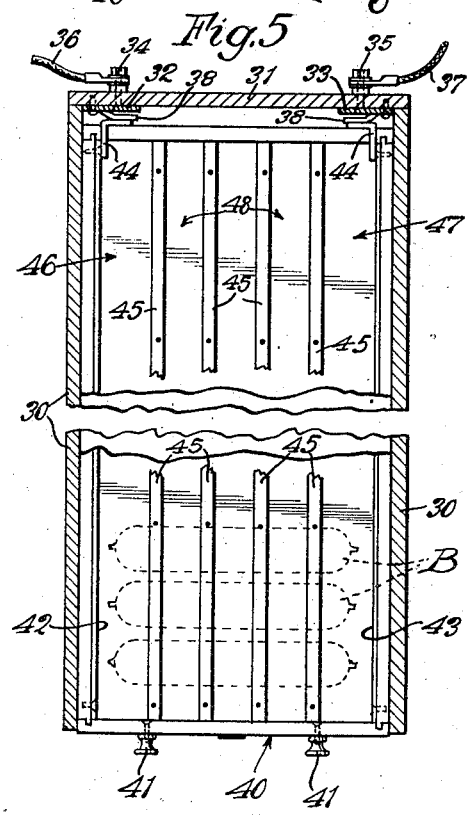
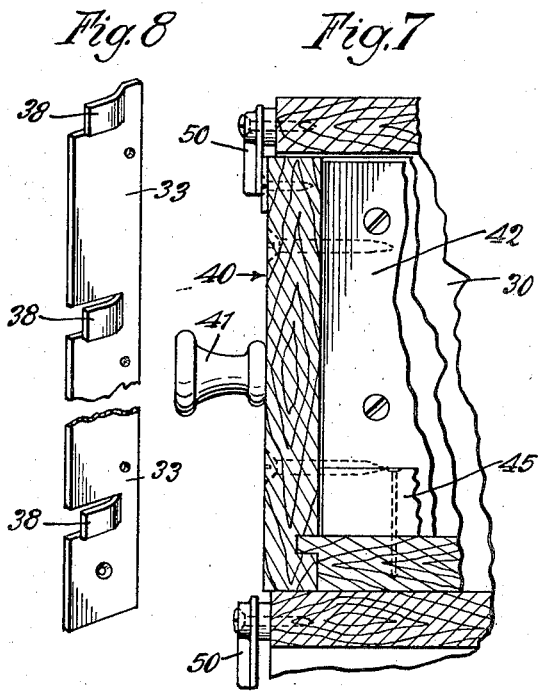
Inventor
Enoch L. Griffith
by W. Bartlett Jones,
Attorney.

Feb. 9, 1943.                E. L. GRIFFITH                2,310,690
                 COOKING FOOD BY ELECTRIC CONDUCTANCE
                     Filed Oct. 19, 1940            3 Sheets-Sheet 3
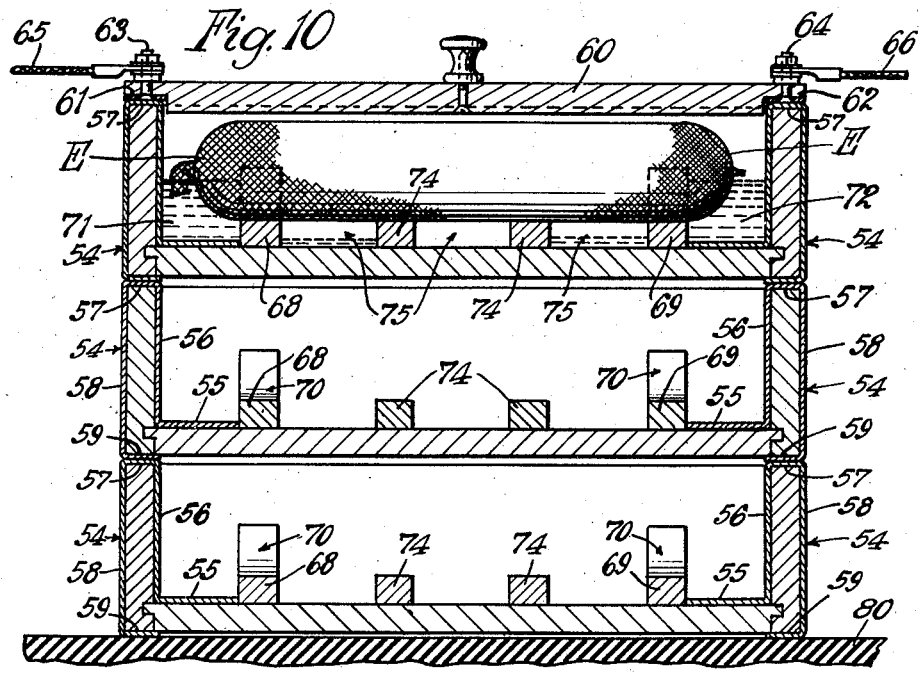
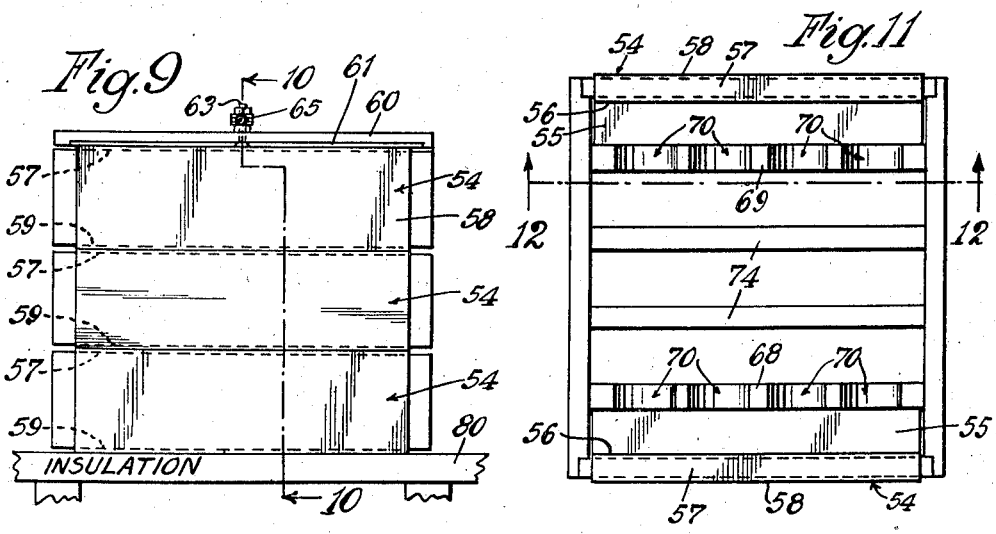
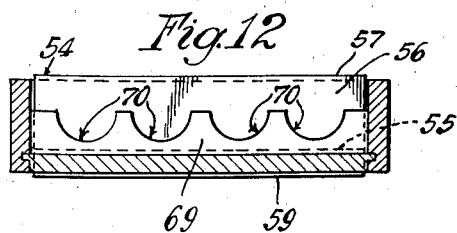
Inventor
Enoch L. Griffith
by W. Bartlett Jones
Attorney.

Patented Feb. 9, 1943

2,310,690

UNITED STATES PATENT OFFICE 2,310,690

COOKING FOOD BY ELECTRIC CONDUCTANCE

Enoch L. Griffith, Chicago, Ill., assignor to The Griffith Laboratories, Inc., Chicago, Ill., a corporation of Illinois Application October 19, 1940, Serial No. 361,841

7 Claims. (Cl. 53—21)

The present invention relates generally to cooking articles of food by electrical conductance, and in particular it relates to the wholesale cooking of large pieces of meat, as required in the packing house industry, such as chickens, turkeys and other fowl, hams, bologna, and other large pieces of natural forms and artificial forms, like stuffed casings.

The idea of passing an electrical current through meat to cure it, or to thaw frozen meat, has long been known. The idea of passing a current through large pieces of meat to cook it has been known, but not commercialized. Various electrical conductance cookers for frankfurters and the like, have been both suggested and commercialized. These have taken the form of small units for domestic power voltages for use on lunch counters for cooking short orders sporadically as received.

The prior art devices are lacking in certain principles of construction and operation for use in production processes, as for example, in packing house practice. The successful cookers for frankfurters are of one general type, wherein two electrode systems are arranged to be bridged by a frankfurter, which in effect shorts the electrode systems by carrying a current which cooks the article. Encountered defects are heating too fast or too slow. Slow heating gives time for the casing to dry, embrittle, and burst, and this in general defeats the purpose of the cooker to hasten the process compared to normal means. Too-fast cooking generates steam and bursts the casing before proper attention to remove the frankfurter may be given.

Such cookers are timed generally by the nature of the electrode system. Some provide for an electrolyte solution, usually a kitchen salt solution, into which the ends of an arcuate frankfurter are dipped, with or without touching a metal electrode. Some provide means to keep the article from touching the electrode, and others intend the article to touch the electrode. Some permit great variations in the length of path through electrolyte to be traversed by the current before reaching the frankfurter. None of them are adapted for a straight length of article such as a straight frankfurter, or a straight elongated piece of meat, or for a chunk of meat. Some provide small areas of electrode, and some large areas relative to the area of the article of food in electrical contact.

Another form of food cooker is a vessel with an electrode at the bottom on which the food, such as a "roast," may rest, with an upper electrode movable to lie on top of the food for contact. Use of liquid to reach up to or above the top electrode is recommended to avoid burning. Another recommended form is a box with fixed vertical plates as electrodes between which meat to be cooked is packed close to the electrodes.

In experimenting with devices of this general nature for use in a wholesale industry, many defects in principle and application have been discovered which appear to be reasons why this art has not developed commercially in the packing house or a like production use.

Rapid cooking is an essential result in order to compete with prior practice. An advantage of quick cooking is minimizing of shrinkage, which is enhanced where the food is submerged in water or electrolyte solution. Therefore, minimizing long-time contact with water while cooking is a desired feature. In order to secure rapid cooking the current must be relatively high. This is attained by the nature of the electrical contact to the food. Where the food touches an electrode a large area of contact gives the current required, but it also produces scorching at contact, which affects the appearance and taste. A small area of contact in the absence of electrolyte or liquid likewise gives a local high current to induce scorching. Surrounding a small area of contact with a conducting electrolyte tends to minimize, but does not avoid the scorching. A large area of direct contact to an electrode cannot be supplied with a quenching liquid or electrolyte. In the small frankfurter cookers, the depth of electrolyte, the form, small size and weight of the frankfurter, may permit a tangential contact with a metal electrode, and such has not been found to be a serious disadvantage. However, if an attempt is made to duplicate the nature of this contact with a large sized encased meat, such as 3 to 4-inch diameter bologna, the weight of the article tends to flatten the form at contact and induce burning, even if the contact is covered with electrolyte. Also, the amount of current required causes too much heat at such contact area. This overcooks the meat or causes steam pressure and bursting of encased meats.

According to the present invention the food is cooked with avoidance of direct contact with an electrode, and through contact made to the food by an electrolyte solution which itself is in contact with the electrode. In experimenting with such principle, several important things have been discovered. Enough current must be supplied to the food to effect speed in cooking. The resistance of the circuit between the food and the electrode must be low while avoiding a localized heavy current to the food. A large area of electrode must be provided so that current tends to converge to food through electrolyte. Sufficient minimum distance between food and electrode must prevail to permit this and to avoid local heavy current at the nearest area of the food to the electrode. The concentration of electrolyte in the liquid, such as sodium chloride, may be varied to control the current, and hence the time of cooking.

While attempting to consider all of these features, and at the same time to avoid excess bathing of the food in the electrolyte, it has been found that one condition may work against another, and that a balance must be effected.

In limiting the depth of liquid for contact, it is desirable to avoid submerging the article, in part to limit or avoid a liquid conductance path between the electrodes and parallel to the article, without impairing the desired effectiveness of electrical contact by liquid to the article. The present invention aims to secure these results.

Another feature of the invention is to limit the time period of electrical cooking, not only for economy in power, but to limit shrinkage and limit change in surface appearance.

The present invention relates to process which may in part be carried out in the apparatus of my copending application Serial No. 361,842, filed October 19, 1941, and which has matured into Patent No. 2,299,088.

An object of the present invention is to cook articles of food rapidly by contact to opposed ends thereof of electrolyte solution which is in contact with electrodes, while avoiding direct contact of the electrode and the article.

Another object of the invention is to use pre-warmed uncooked food for electrical conduction quickly to add heat to cook.

Still another object of the invention is to minimize coverage of the body of the article with electrolyte while cooking by contact with electrolyte.

A particular object of the invention is to expose much of the article to a gaseous atmosphere while cooking by electrical conductance, and retaining water vapor in said atmosphere to limit drying out of the exposed area of the article.

Another object of the invention is to form contact pools of electrolyte with a level above the level of any electrolyte which may be present and in contact with the article between said pools Another object of the invention is to cook a plurality of substantially identical articles at once in accomplishing one or more of the foregoing objects.

Various other and ancillary objects and advantages of the invention will become apparent from the following description and explanation of the invention, in part explained by reference to the accompanying drawings, in which:

Fig. 1 is a plan view of a cooker in which a fowl is shown, placed for cooking.

Fig. 2 is a view of a vertical longitudinal section of the cooker of Fig. 1 on line 2—2 thereof.

Fig. 3 is a view of a vertical section of the cooker on line 3—3 of Fig. 2.

Fig. 4 represents a front view of a cooking cabinet with drawer-like cooking trays.

Fig. 5 is a view of horizontal section of the cabinet on line 5—5 of Fig. 4.

Fig. 6 is a view of vertical section of the cabinet from front to rear on line 6—6 of Fig. 4.

Fig. 7 is a view of a fragmentary vertical section of the cabinet of Fig. 4 on line 7—7 thereof, showing the construction and the locking of the drawer.

Fig. 8 is a perspective view of a contact bar in the rear of the cabinet.

Fig. 9 is a front elevation of a modified form in which cooking trays are superimposed for simultaneous operation.

Fig. 10 is a view of a vertical section of the assembly of Fig. 9 taken on line 10—10 thereof.

Fig. 11 is a plan view of one of the trays of the assembly of Fig. 9.

Fig. 12 is a view of a vertical section of the tray of Fig. 11 taken on line 12—12 thereof.

The invention in its preferred aspect will be explained more particularly with reference to its advantages in the wholesale production of cooked meats for sale. Hams and encased meats such as bologna are the most common large pieces to be cooked for sale.

Bologna and the like encased meats may be up to 20 inches more or less in length and 3 to 4 inches more or less, in diameter. These are now steamed or boiled, which takes a long time, results in shrinkage, and frequently in breaking of the casing, commonly of cellulose. The finished cooked article therefore lacks the smooth full rounded appearance which it has when raw.

By the present invention, I take the bologna, or the like (and the process applies also to hams and other forms), in their raw salt-cured form, to a smoke-house. In the smoke-house they are heated by warm air and smoke, but not to so high a temperature as to cook the meat. They may be from 100° to about 135° F. for example, without a cooking effect. The warm smoked meat is thus preheated so that less heat units need be added to attain a cooked condition of 155° to 160° F. or more. The smoking process may impart a characteristic appearance or color. One or more pieces is then placed in an electric cell adapted to contact opposing portions of the article with electrolyte solution.

Where one piece is used, less care is required in placing the article in the cell. Where a plurality of articles is cooked at once, all must be properly related to form current paths which produce nearly equivalent cooking, so that one does not become over-cooked before the slowest one is just cooked. In using a plurality of like stuffed casings, this may be readily accomplished by laying all the articles in parallel horizontal position with each having substantially the same relations between electrolyte in the cell, electrode, and contact-end of each article, all being arranged to provide substantially the same cooking current for each piece.

In the case of placing in parallel positions a row of articles of less uniform character, such as hams, or fowl, the articles in a plurality should be grouped for close identity in size, and then they are individually placed in the cell to present substantially identical conductance paths. Where the full cooking area of the cell is covered with a packed arrangement of articles of miscellaneous size, the group may act as a unitary mass, and the arrangement requires only close packing to effect such result.

The foregoing conditions are more easily attained by limiting immersion of the article in liquid or electrolyte, and by confining or controlling the electrolyte contact at opposed portions or ends of the article or unitary mass. This may be done in part by damming the electrolyte, using the article or mass as a component part of the dam, into elevated pools at the electrode-ends of the cell. Preferably, electrolyte is avoided intermediate the pools, so that there is no liquid electrical conductance path in parallel with and in contact with the intermediate portions of the mass or article. Thus, all or part of the intermediate portion of the mass or article, may be exposed to the atmosphere in the cell.

In the case of bologna so exposed, it may be observed that as the temperature of the article begins to rise from about 120° F., water vapor begins to rise from the article. If this is allowed to escape by having an open-topped cell, the casing quickly dries out as the temperature approaches 160° F., even though this occurs in as little as 5 minutes time. The drying causes the casing to weaken and burst, thus injuring the saleability of the article. One attempt to avoid this is to house the bologna in a stockinette of coarse mesh cloth commonly used for hams, and to wet the casing and the net with water or electrolyte liquid prior to cooking. Even if the net is not used, soaking the casing in salty water toughens the casing material to withstand pressure from within. Salt solution causes better retention of water by the casing wet with salt solution, compared to using water to wet the casing.

The bursting of the exposed part has been successfully avoided by enclosing the atmosphere of the cell to retain the water vapor, and thus limit the drying of the casing. The presence of the stockinette aids in this protection, as well as does the wetting of the casing.

Also, I have found that the appearance of the exposed portions of bologna, hams and the like, especially the appearance from the smoking, is better where the vapor is thus retained. Where smoked hams, for example are thus cooked electrically, the short time of exposure to heat minimizes changes in the surface appearance and the surface layers. Where the surface is exposed to liquid in the cell, there is one kind of change, and where it is exposed to evaporation of water, there is another kind of change. Where the cooking is slow these differences become pronounced, but where an article is cooked more quickly by the present invention, and water vapor retained, the differences are not visible, and the original appearance is retained except for the uniform change due to the coagulation and the like resulting from the cooking. Thus, the smoked cooked products preserve their original smoked appearance.

I have found that the time of cooking may be made to vary over a wide range for any given cell with fixed electrodes connected to a fixed voltage. It is of course to be understood that the cell is preferably designed for a fixed voltage, and this design includes the spacing between electrodes, area of electrodes, permissible depths of electrolyte, and length of electrolyte path between article and electrode.

Given a cell, a fixed voltage, and a given sized bologna for example, the latter may be placed horizontally in the cell with its ends spaced, for convenience, equally from metal electrodes. Then a salt solution is added to cover the bologna. If a voltage for cooking current is applied, current passes not only through the bologna but also through the electrolyte alongside the meat. This wastes heat in heating the electrolyte. The preferred electrolyte is less conductive than the meat, so that the meat heats faster than the electrolyte bath. This causes the surface layers of the article to be cooled by the bath. The overall electrical contact to the meat by such electrolyte gives non-uniform current in the meat and it heats unevenly, the lack of uniformity being more apparent, the shorter the cooking time. Thus, in general, total or any immersion is undesirable. For one reason, it is undesirable in wasting current.

If the contact electrolyte is strengthened, greater current flows through it to the article and the cooking time is decreased. If the strength is weakened, the cooking time is prolonged. With a given strength, if the depth is reduced in partially exposing the article, the time is prolonged. Thus, by control of strength of electrolyte and depth at the electrodes, the cooking time may be controlled.

The present invention makes use of these features by damming the electrolyte or otherwise forming pools at the electrodes, of controlled depth, and in these pools the strength of electrolyte may be varied to control the time. The damming may permit some electrolyte to remain in contact with the article between the pools, or it may be made to exclude it altogether. Practically, it may be found that some electrolyte leaks through the dams to the space between the dams. This may not reach the article, if it is elevated on platform means above the main floor of the cell, and it may be made to be ineffective as a current path in which to waste electric power.

The distance between the end of the article and the electrode, or the length of the electrolyte path, may be increased to slow the cooking or decreased to speed it. However, there are precautions to be observed. A relatively larger area of electrode than of article contacted is preferred, in order that the current converge from electrode to article through the electrolyte. With such a relatively large area, it must be observed that the nearest point of the article is not so close to the electrode as to cause a concentration of or localized current.

Also, I prefer to provide live contact liquid on the underside of the portion of the article in electrical contact with electrolyte. Thus, to lay the bottom of the article on a non-electrode area on the bottom of the cell, excludes the interface from receiving contact to lead current to the article. I may accomplish this by providing a well-like structure below the supported end of the article, or by means to elevate the article, or by a dam with a recess to receive the end of the article.

As an electrolyte, I prefer a solution of sodium chloride. The actual strength of this greatly affects the cooking time which is required for any given set-up. I prefer a salt solution which is from ⅛% to 1% by weight. In this range, the best results have been obtained with solution from ¼% to ½% sodium chloride. Variations permit controlling the time desired to attain a given temperature from a given temperature.

With a ¼% sodium chloride solution, I have cooked 20 to 21-inch x 4-inch bologna, previously smoked, in 5 to 7 minutes to 160° F. from about 100° F., using from no immersion of the body to 50% immersion, and at least 50% immersion of the ends by raised pools, where the body was less immersed or not at all immersed. Under these conditions, several, for example six pieces, have been simultaneously cooked to the same extent in the same time.

In the case of a ham or a fowl, the same is preferably placed endwise between the cells, on a platform or equivalent means to cause the ends to overlie live electrolyte. The irregular shapes make dams less practical, so for such objects, partial immersion in floor electrolyte is practiced, using from ⅓ to ½ total immersion of the article. The article may be turned over after half the cooking period, thus to treat both surfaces to liquid and to vapor exposures, for increased uniformity. To preserve the moisture, the cell is preferably shallow, like a tray, and is provided with some means to close it, for retaining vapor formed.

Fig. 1 represents a cell which may be made of plastic material, such as Bakelite, with electrodes incorporated in the molding. It has a box-like body 10, and is large enough to house a large ham, a turkey, or several bologna about 20 inches long. In the ends are electrode plates 11 and 12, which may be iron, steel, carbon, or chromium-plated metal. Connector studs 13 and 14 pass to the outer side of the box as terminals for cables 15 and 16.

In the bottom, means is provided to serve as a supporting platform area for one or more bodies to be cooked. Preferably such means is molded integrally with a plastic box 10, but it may be removable inserts. As shown, it comprises integral bars 17 on the floor, dividing the floor into isolated wells or pools, 19 and 20 at the ends, and 21 intermediate the ends. The end pools contain the electrodes 11 and 12.

An article to be cooked is placed upon the platform whereby it is raised to permit electrolyte in the pools 19 and 20 to provide current to the underside of the article, convergingly from the electrode to the article. For illustration, a turkey is shown, about half immersed in brine solution, of for example ¼% strength. The bars 17 serve as insulating partitions to cut down the liquid current path through the liquid in pools 17—21—20. In order to cut down the liquid current path above the bars and along-side the turkey, the bars or partitions may be effectively extended by placing non-conducting pieces in the path of the current, such as blocks of wood 23 and 24. This principle may be applied in the apparatus of Fig. 1 and in the other and modified forms for the same objectives, and such insulators are more particularly useful in a cell with deeper electrolyte, a large irregular form, or one incompletely loaded with regular forms. The result is not only one in economy, but in concentrating the electrical contact to the article more to the ends or portions in the vicinity of the electrodes. Also, for this objective, the wings and legs of fowl, are tied down to the body of the fowl to create and maintain bigger endwise bulk for such contact.

The cell is provided with a lid 25 to keep water vapor in the cell in contact with the exposed area of the article being cooked.

The apparatus of Fig. 1 may be used in a hotel or like kitchen for quickly cooking a fowl or a ham. Also, a plurality may be cooked at once. It may also be used for cooking a number of bologna at once, in a packing house, by placing them in parallel on the bars 17. However, in such industrial use, larger and modified units are preferred.

One of these is shown in Fig. 4, which represents a cabinet, like a chest of drawers, in which the drawers are cooking trays. Safety features are involved in its construction and use. The trays are electrically disconnected when pulled out slightly, or more so, from the cabinet body. The drawers may be as deep as desired, and as many as desired. Wood is a suitable material as it may be easily replaced. It may have plastic varnishes if desired, or it may be a wood core with an integral plastic coat molded to it. Where it is simply wood, the drawers are made sufficiently loose fitting to take care of swelling, but such looseness is not illustrated in the drawings.

In Fig. 4, the numeral 30 represents a chest-like cabinet having the back panel 31 fitted with parallel contact bars 32 and 33 vertically in the rear corners. These have terminals 34 and 35 at the back for cables 36 and 37. Fig. 8 shows bar 33 with resilient off-set portions 38 spaced to contact a companion member on a drawer.

Each drawer is designated 40. It has pulling handles or knobs 41 on the front. The sides of the drawer (ends of the cell) have electrode plates 42 and 43 secured to the drawer, and each electrode has an angular extension 44, which may be welded to the plate at the rear. One face of the angle-extension lies against the back of the drawer to make contact with one of the parts 38 on the cabinet contact bars 32 and 33.

The interior of the drawer is similar, fundamentally, to the bottom of the cell of Fig. 1. There are parallel strips 45, as of wood, secured to the floor, forming electrode pools 46 and 47 and intermediate pools 48. The lower drawer is shown as being filled with bologna B, placed on the bars 45 with ends facing the electrodes. Electrolyte, for example, ¼% to ½% sodium chloride, is used to about 50% coverage. The bologna may touch each other advantageously to reduce the liquid path alongside the bologna.

In operation, the cabinet encloses the space in the cell to retain water vapor. No current can flow in a cell until it is closed, and hence there is little danger of an operator inserting his hand into the cell, or of touching a live part of the cell. A lock, as in the form of a turn button 50, may be provided for each drawer, to keep it closed with pressure on the resilient contact member 38.

The tray or cell structure of the invention is not limited to the form shown in Fig. 1 and Fig. 4. A modified cell interior is shown and is incorporated in a modified assembly of Fig. 9 for a plurality of cells. This constitutes a cell or tray of which a plurality may be superimposed to form an operative stack, the cover of which may be used to provide final contact. Each tray is made with an electrical contact above and below, to complete a current connection throughout the pile.

Thus, in Fig. 10, a box-like tray 54 is shown with an electrode having a horizontal portion 55 and a vertical portion 56. The vertical portion extends over the top edge at 57, down the side at 58, and under the bottom at 59. The bottom part 59 fits over the top part 57 of another tray, as they are piled. A lid or cover 60 is provided with two contact bars 61 and 62, terminals 63 and 64, and cables 65 and 66. The bars 61 and 62 are positioned to rest on tray contacts 57 when the lid is on a tray. The cover 60, or the bottom of a covering tray 54, keeps water vapor in the cell.

The cell structure has dams designed for cooperation with bologna-like articles to close the dams and form elevated pools of electrolyte at the electrodes. Thus, the high partitions 68 and 69 have recesses 70 therein to receive bologna, as shown, with ends E projecting into the electrode pools 71 and 72. Intermediate strips 74 support the body of the articles and provide intermediate pools 75.

The electrode pools are shown having electrolyte solution dammed above the lower part of the body of the bologna, which need not be immersed at all. If the dams leak fluid, it flows into the adjacent wells 75 as shown, and it need not enter the innermost one. Thus, there is no liquid path across the cell, filled and leaking as illustrated and described for Fig. 10. The intermediate strips serve as insulators to break and prevent a possible liquid connection across the floor of the cell.

It is understood that all of the cells are preferably placed on a suitable platform, such as shown at 80, electrically insulated.

Alternating current is employed to avoid electrolysis and electro-migration. Practically, for large sizes of meats industrially encountered, and for the desired quick cooking time industrially required, a voltage higher than 110 volts is indicated, and preferably 220 volts is used. A three-phase system may be employed, using three like units, as will be well understood by electricians, and in such cases, the units are similarly filled and operated to effect a balanced load.

The invention may be practiced in forms of cells other than those herein described, as set forth in the appended claims.

I claim:

1. The method of producing cooked meat products in cellulosic casings, which comprises wetting the cellulosic casing with a solution of electrolyte, placing opposite portions of the article in contact with an electrolyte solution while avoiding submergence of all the article, converging an electric current through the electrolyte towards said portions of the article to pass a cooking current through the article, confining water vapor over the exposed surface of the article, and continuing the current to effect cooking of the article, the water vapor avoiding the drying of the exposed surface tending to result from the rising temperature of the article.

2. The method of producing cooked meat products in cellulosic casings, which comprises wetting the cellulosic casing with a solution of sodium chloride, placing opposite portions of the article in contact with an electrolyte solution while avoiding submergence of all the article, converging an electric current through the electrolyte towards said portions of the article to pass a cooking current through the article, confining water vapor over the exposed surface of the article, and continuing the current to effect cooking of the article, the water vapor avoiding the drying of the exposed surface tending to result from the rising temperature of the article.

3. The method of producing cooked meat products in cellulosic casings, which comprises placing the article in a stockinette-like jacket with a solution of electrolyte, wetting the casing and the jacket, placing opposite portions of the article in contact with an electrolyte solution while avoiding submergence of all the article, converging an electric current through the electrolyte towards said portions of the article to pass a cooking current through the article, confining water vapor over the exposed surface of the article, and continuing the current to effect cooking of the article, the water vapor avoiding the drying of the exposed surface tending to result from the rising temperature of the article.

4. The method of producing cooked meat products in cellulosic casings, which comprises placing the article in a stockinette-like jacket, wetting the casing and the jacket with a solution of sodium chloride, placing opposite portions of the article in contact with an electrolyte solution while avoiding submergence of all the article, converging an electric current through the electrolyte towards said portions of the article to pass a cooking current through the article, confining water vapor over the exposed surface of the article, and continuing the current to effect cooking of the article, the water vapor avoiding the drying of the exposed surface tending to result from the rising temperature of the article.

5. The method of producing cooked meat products in cellulosic casings, which comprises placing the article in an electric cell containing electrolyte solution in quantity sufficient to contact opposite portions of the article in the vicinity of spaced electrodes of the cell and in quantity to make contact with the length of the article between said portions while avoiding submergence of the article, wetting the exposed portion of the article with a solution of electrolyte, converging an electric current through the electrolyte to said portions of said article, confining water vapor over the exposed surface of the article, and continuing the current to effect cooking of the article, the water vapor avoiding the drying of the exposed surface tending to result from the rising temperature of the article.

6. The method of producing cooked meat products, which comprises placing the article in an electric cell containing electrolyte solution in quantity sufficient to contact opposite portions of the article in the vicinity of spaced electrodes of the cell and in quantity to make contact with the length of the article between said portions while avoiding submergence of the article, covering the exposed portion of the article with a fabric wet with a solution of electrolyte, converging an electric current through the electrolyte to said portions of said article, confining water vapor over the so-covered surface of the article, and continuing the current to effect cooking of the article, the water vapor avoiding the drying of the covering fabric and article surface tending to result from the rising temperature of the article.

7. The method of producing cooked bologna-like encased meat products, hams, fowl and like articles capable of containing a plane lying within the article from one portion to an opposite portion, which comprises placing the article with said plane in a substantially horizontal position in an electric cell having opposed electrodes whereby said opposed portions of the article lie in the vicinity of the electrodes, placing an electrolyte solution in the cell to bridge the spaces between said portions and said electrodes and between said electrodes, while avoiding submergence of the article in said solution, wetting the exposed surface of the article with a solution of electrolyte, converging an electric current through the electrolyte towards said portions of the article, confining water vapor over the exposed surface of the article, and continuing the current to effect cooking of the article, the water vapor avoiding the drying of the exposed surface tending to result from the rising temperature of the article.

ENOCH L. GRIFFITH.

CERTIFICATE OF CORRECTION.

Patent No. 2,310,690. February 9, 1943.

ENOCH L. GRIFFITH.

It is hereby certified that error appears in the printed specification of the above numbered patent requiring correction as follows: Page 5, first column, line 59-60, claim 3, strike out the words "with a solution of electrolyte" and insert the same after "jacket" and before the comma in line 61, same claim; and that the said Letters Patent should be read with this correction therein that the same may conform to the record of the case in the Patent Office.

Signed and sealed this 4th day of May, A. D. 1943.

(Seal)

Henry Van Arsdale,
Acting Commissioner of Patents.